United States Patent
Reynolds et al.

(10) Patent No.: US 6,598,640 B1
(45) Date of Patent: Jul. 29, 2003

(54) WHEEL AND TIRE ASSEMBLY HAVING A BEAD SEAT ANGLE IN THE RANGE OF 10 DEGREE TO 12 DEGREE

(75) Inventors: Ralph Reynolds, Caryville, TN (US); Rich Coonce, Des Moines, IA (US); Steve Ownby, Clinton, TN (US); Brent Taylor, Quincy, IL (US); Maurice M. Taylor, Grosse Pointe Farms, MI (US); Joe Clerger, Farragut, TN (US); Dave Kuhl, Qunicy, IL (US)

(73) Assignee: Titan Wheel International Inc., Quincy, IL (US)

( * ) Notice: Subject to any disclaimer, the term of this patent is extended or adjusted under 35 U.S.C. 154(b) by 0 days.

(21) Appl. No.: 09/394,776

(22) Filed: Sep. 13, 1999

Related U.S. Application Data

(63) Continuation-in-part of application No. 08/842,826, filed on Apr. 17, 1997, now abandoned.

(51) Int. Cl.[7] .................... B60C 3/04; B60C 15/02; B60B 21/02
(52) U.S. Cl. .................. 152/539; 152/454; 152/378 R; 152/379.5; 301/95.101
(58) Field of Search ................... 152/539, 454, 152/523, 525, 378 R, 379.5, 544; 301/95.101, 96, 97, 98

(56) References Cited

U.S. PATENT DOCUMENTS

| | | | |
|---|---|---|---|
| 3,830,275 A | | 8/1974 | Russell |
| 4,029,139 A | * | 6/1977 | Abbott ............... 152/379.1 |
| 4,077,455 A | * | 3/1978 | Curtiss ............... 152/354 |
| 4,353,403 A | * | 10/1982 | Ruip ............... 152/523 |
| 4,462,447 A | * | 7/1984 | Siefert et al. ............... 152/454 |
| 4,641,670 A | * | 2/1987 | Poque ............... 152/158 |
| 5,749,982 A | * | 5/1998 | Muhlhoff ............... 152/158 |

FOREIGN PATENT DOCUMENTS

| | | |
|---|---|---|
| EP | 0434206 | 6/1991 |
| EP | 0640500 | 3/1995 |
| FR | 1158208 | 1/1958 |
| FR | 1195309 | 11/1959 |
| GB | 1498886 | 1/1978 |

\* cited by examiner

*Primary Examiner*—Michael W. Ball
*Assistant Examiner*—Justin Fischer
(74) *Attorney, Agent, or Firm*—Ladas & Parry

(57) ABSTRACT

A wheel assembly includes a tire, having each bead seat angle in the range of 10 degree to 12 degree with respect to the axis of rotation, preferably 11 degree, and an aspect ratio of less than 60%, and a wheel rim, having a circumfurential well and a bead support surface angle also in the range of 10 degree to 12 degree, each bead support surface terminating in an upstanding flange overlapping a radially inner portion of the tire to support the sidewall of the tire. The flanges may be part circular in cross section defining a segment of approximately 135 degree, the radius of curvature being greater than 0.5 inches and preferably 0.75 inches.

2 Claims, 3 Drawing Sheets

WHEEL AND TIRE ASSEMBLY HAVING A BEAD SEAT ANGLE IN THE RANGE OF 10 DEGREE TO 12 DEGREE

This application is a continuation in part of U.S. application Ser. No. 08/842,826 filed Apr. 17, 1997 now abandoned.

BACKGROUND OF THE INVENTION

The present invention relates to vehicle wheels and tires and in particular to such wheels and tires used in off-highway vehicles.

It is of course well known to provide a vehicle with a pneumatic tire mounted upon a wheel rim to support the mass of the vehicle. With off-road vehicles, such as construction equipment or material handling equipment, it is usual to use relatively large diameter wheels and large aspect ratios; that is, the ratio of the height of the tire to the width of the tire, to support the high loads normally encountered. In this manner, the tire may deflect to present a footprint capable of supporting the loads on the vehicle.

One problem associated with such combinations of wheels and tires is the instability introduced at higher speeds, particularly during travel along paved highways. In those situations, the flexibility found in conventional tire construction causes bouncing of the tire and renders control of the vehicle difficult.

In order to be commercially viable, it is necessary to be able to mount the tire to a one-piece rim using conventional tire installation equipment. For this purpose, a well is provided in the central portion of the rim to accommodate a bead seat and allow the tire to be fed over the rim prior to inflation. To seal the tire against the rim, a bead seat is provided and to be effective this must ensure an adequate interference between the tire and the wheel to effect a seal. Typically the bead seat is formed with an inclination to the axis of rotation in the order of 5°. While this facilitates ease of installation, it does not effectively seal the tire particularly under the high lateral loads that may be encountered during normal use. An alternative configuration in general use has a 15° bead seat. This configuration is derived from a three-piece wheel in which tire mounting is facilitated. However, with a single piece wheel, a 15° bead seat angle is difficult to mount and does not offer good retention.

It is therefore an object of the present invention to provide the components of a vehicle wheel assembly that obviate or mitigate the above disadvantages.

SUMMARY OF THE INVENTION

In general terms, the present invention provides a tire for a vehicle that has a pair of annular beads laterally spaced apart along the axis of rotation. A plurality of plies extend between the beads to define a tire having a pair of radially extending sidewalls and a tread portion. An elastomeric cap covers the carcass and extends across each of the sidewalls and the tread portion. The plies extend about the beads to provide an inwardly directly bead seat for sealing against a rim. The bead seat has a substantially frustoconical inwardly directed sealing surface inclined to the axis of rotation at an angle of between 10° and 12°. The tire has a radial spacing between the sealing surface and the radially outer surface of the cap that is less than or equal to 65% of the maximum width of the tire in a free body state.

In a further aspect of the invention, there is provided a wheel rim for a vehicle. The rim has a circumferential well with a base and a pair of upstanding sidewalls. A pair of lateral extensions project from respective ones of the sidewalls to a pair of bead support surfaces. Each of the bead support surfaces is frustoconical with an included angle of between 20° and 24°. The bead support surfaces terminate at laterally outer edges in upstanding flanges directed to an opposite side of the lateral extensions to the well.

A still further aspect of the invention provides a vehicle wheel assembly having a rim and a tire mounted on the rim. The rim has a centrally disposed well and a frustoconical bead support surface to either side. The bead support surfaces have an angle of between 10° and 12° with respect to the axis of rotation. The bead support surfaces terminate in an upstanding flange overlapping a radially inner portion of the tire. The tire includes a pair of annular beads, each associated with a respective one of the bead seats. A plurality of plies extends between the beads to define a tire having a pair of radially extending sidewalls and a tread portion. An elastomeric cap covers the tire and extends across each of the sidewalls and the tread portion. The plies extend about the beads to provide an inwardly directed bead seat for engagement with the bead support surfaces. The bead seat has a substantially frustoconical inwardly directed sealing surface complementary to the bead support surfaces. The tire has a radial spacing between the sealing surface and a radially outer surface of the cap that is less than or equal to 65% of a maximum width of the tire in a free body state.

BRIEF DESCRIPTION OF THE DRAWINGS

An embodiment of the invention will now be described by way of example only with reference to the accompanying drawings, in which.

DESCRIPTION OF THE PREFERRED EMBODIMENTS

Figure 1:
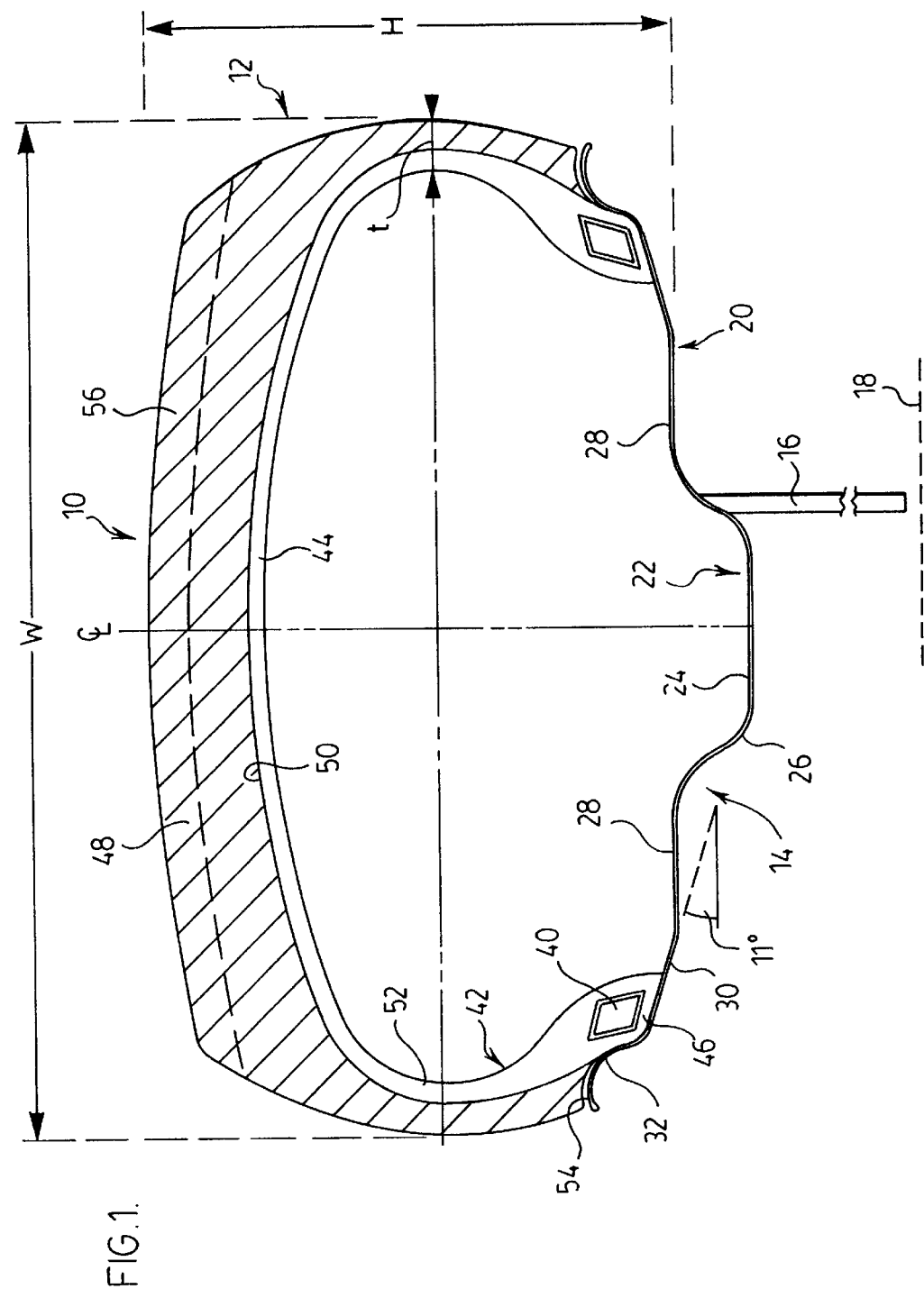
FIG. 1 is a section through a vehicle wheel assembly.

Referring therefore to FIG. 1, a vehicle wheel assembly generally designated 10 includes a tire 12 mounted upon a wheel 14. The wheel 14 has a wheel disc 16 secured to a hub of a vehicle for rotation about an axis generally indicated at 18 and a rim 20. The wheel assembly 10 is intended for use with an off-road vehicle such as a wheeled backhoe or loader.

The rim 20 is rolled out of steel and includes a centrally-disposed well 22 having a base 24 and a pair of sidewalls 26. Each of the sidewalls 26 smoothly merges with lateral extensions 28 which connect the sidewalls 26 to bead support portions 30. Each of the bead support portions 30 terminates in a flange 32 that projects radially outwardly on the opposite side of the extensions 28 to the well 22.

The bead support portions 30 are frustoconical having an included angle in the preferred embodiment of 22°. Included angles in the range of 20° to 24° have been found satisfactory. Each bead support portion 30 is thus inclined at an angle of 11° to the axis of rotation 18.

The flange 32 is part circular in cross-section and defines a segment of approximately 135°. The radius of curvature of the flange 32 is greater than 0.5 inches and preferably is 0.75 inches. In the preferred embodiment, the height r of the flange 32, ie. the maximum radial spacing of the flange from the bead support portions 30, is 0.75 inches.

The tire 12 includes a pair of annular beads 40 which are wound from an inextensible wire or cord and have a generally diamond shape in cross-section. A carcass 42 is provided by plies 44 that extend between the beads 40. The plies 44 extend about the bead 40 so as to conform generally to the cross-section of the bead 40 and present a radially inwardly directed frustoconical surface 46 to define a bead seat that is complementary to the bead support surface 30.

The carcass 42 is covered by an elastomeric cap 48 which extends axially over a crown and radially over sidewalls 52 of the carcass 42. The cap 48 terminates at shoulders 54 adjacent the flange 32 and projects axially outwardly to be co-extensive with the flange 32. A tread 56 is formed in the radially outwardly directed surface of the cap 48 in the region of the crown 50.

The tire 12 has an aspect ratio defined as the height H of the tire 12 measured from the radially inner portion of the bead seat 46 to the radially outer portion of tread 56 and the width W measured at the widest lateral spacing of the sidewalls 52. The aspect ratio is less than 60% and preferably less than 50% giving the width W of the tire twice that of the height H.

In practice it has been found that the reduced aspect ratio decreases the bounce associated with conventional tires while still supporting the loads normally encountered with such vehicles. It is believed that this may be attributed to the increased stiffness of the sidewalls resulting from the reduced aspect ratio. Moreover, the shoulder 54 is configured to abut the outer surface of flange 32 to inhibit inward rolling of the bead seat. This in combination with the bead seat angle of between 10° and 12° inhibits separation of the sealing surface 46 from the support surface 30 and the placing of the sidewalls in tension to support a portion of the load.

The bead seat angle of 11° to the axis of rotation has surprisingly been found to maintain an effective seal while at the same time facilitating the installation of the tire on the rim. In tests conducted with a skid steer loader back hoe, a wheel configuration of 10–20.5 was used with a ¾ inch flange height. A tire having a 50% aspect ratio was mounted on the wheel. A bead seat angle of 11° was adopted. It was found that the bead was retained on the rim even with inflation pressures as low as 20 psi. In conventional tires, separation of the bead from the rim can be expected at pressures below 40 psi causing a deflation of the tire on the rim. The bead seat angle of 11° has thus enhanced the retention of the bead seat on the rim while facilitating installation.

Bead seat angles in the range of 10° to 12° have been found satisfactory but 11° is preferred based upon experimental data to date.

As shown in Table I below, different configurations of wheel and tire have been used to obtain the benefits noted above. The designation of rim size and tire size is that normally used in the industry. Thus, a rim size of 8.5×20.5 indicates a width between the radial walls of the bead seats of 8.5 inches and a diameter of the bead seat of 20.5 inches. Similarly, a tire size of 10–20.5 indicates a maximum width of tire indicated at W of 10 inches and a diameter of the bead seat of 20.5 inches.

TABLE I

| Rim Size | Tire Size | Aspect Ratio |
| --- | --- | --- |
| 8.5 × 20.5 | 10 × 20.5 | 48% |
| 10 × 20.5 | 12 × 20.5 | 50% |
| 13 × 33.5 | 14.9 × 33.5 | 54% |
| 11 × 21.5 | 14 × 21.5 | 54% |
| 17 × 32.5 | 19.5 × 32.5 | 47% |
| 14 × 25.5 | 16.5 × 25.5 | 51% |
| 12.5 × 23.5 | 15 × 23.5 | 54% |
| 19 × 53.5 | 20.8 × 53.5 | 53% |
| 15 × 37.5 | 16.9 × 37.5 | 61% |
| 10 × 33.5 | 13 × 33.5 | 64% |
| 22 × 39.5 | 26.5 × 39.5 | 59% |
| 13 × 55.5 | 14.9 × 55.5 | 55% |
| 10 × 21.5 | 12 × 21.5 | 46% |
| 9 × 13.5 | 23 × 10.5 – 13 | 45% |
| 9 × 13.5 | 25 × 12 – 13 | 50% |

In each example, the tire size and aspect ratio is selected to provide an outside diameter for the tire corresponding to a conventional wheel tire combination and the rim size is selected to provide an increased rim diameter corresponding to the bead seat diameter. An 11° bead seat angle is used on each of the examples. A reduced bounce is obtained and the selection of bead seat angles maintains retention of the bead seat at reduced inflation pressures.

It will be seen therefore that by utilizing a bead seat angle in the range of 10° to 12° and an aspect ratio of less than 60%, an improved performance for off-road tires has been attained.

Figure 2:
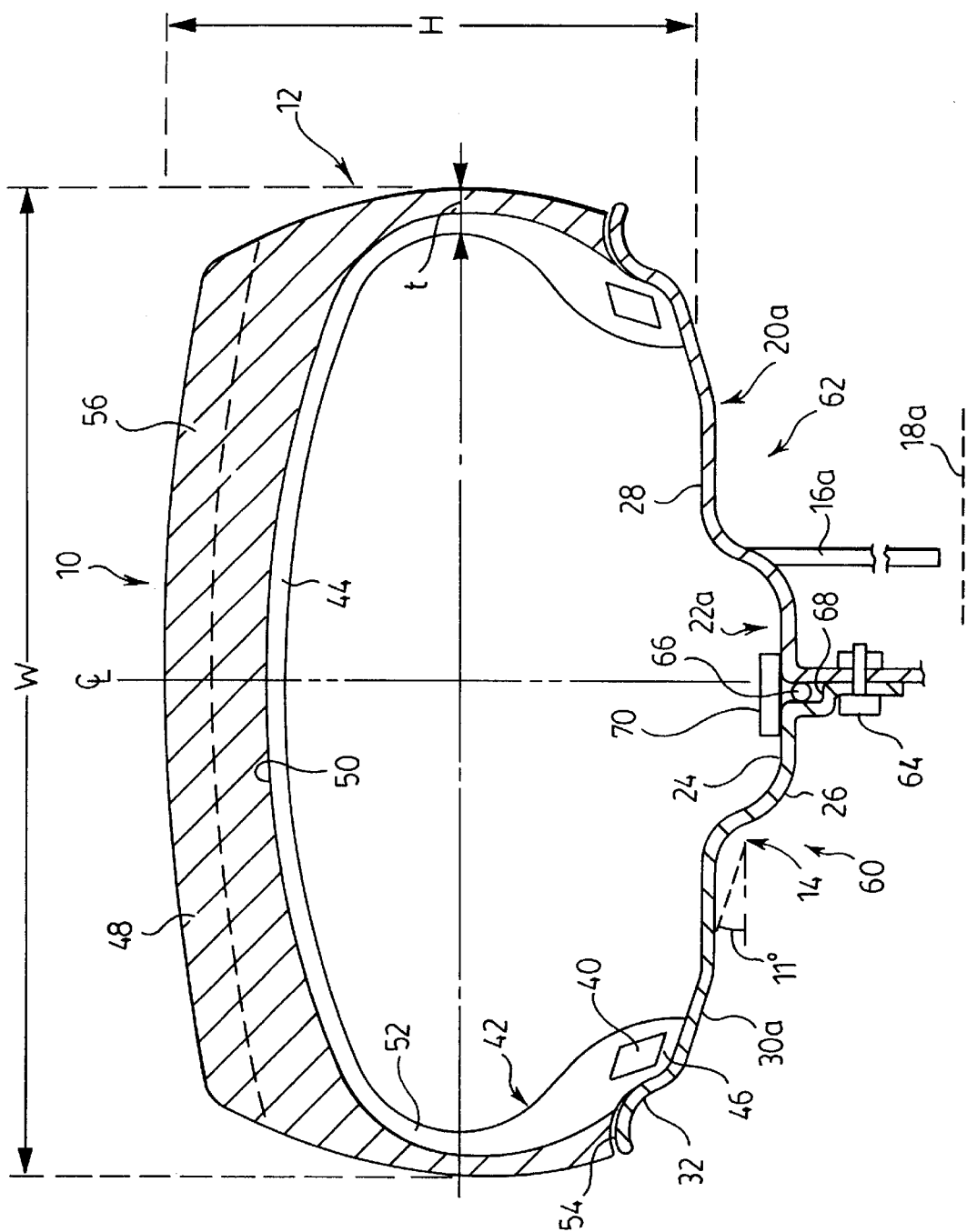
FIG. 2 is a section through an alternative embodiment of rim configuration.

A further configuration of rim is shown in FIG. 2 in which like reference numerals will denoted with like components with the suffix a added for clarity. As may be seen in FIG. 2, the rim 20a is formed as a split rim having opposite halves 60, 62. The halves 60, 62 are bolted to one another by bolt 64 with an O ring 66 trapped in a jog 68 between the two halves 60, 62. A guide 70 is secured to the one halve 60 to retain the 0 ring 66 in place. The other halve 62 is secured to a wheel disc 16a radially inwardly of the connection of the two halves 60,62.

The split rim configuration facilitates the assembly of the tire 12 with the bead seat 30a inclined at between 10° and 12° to facilitate the assembly of the tire 12 whilst retaining the torque transmitting requirements. With the configuration of rim 20a shown in FIG. 2, the centrally disposed well 22a may be reduced or eliminated as preferred.

Figure 3:
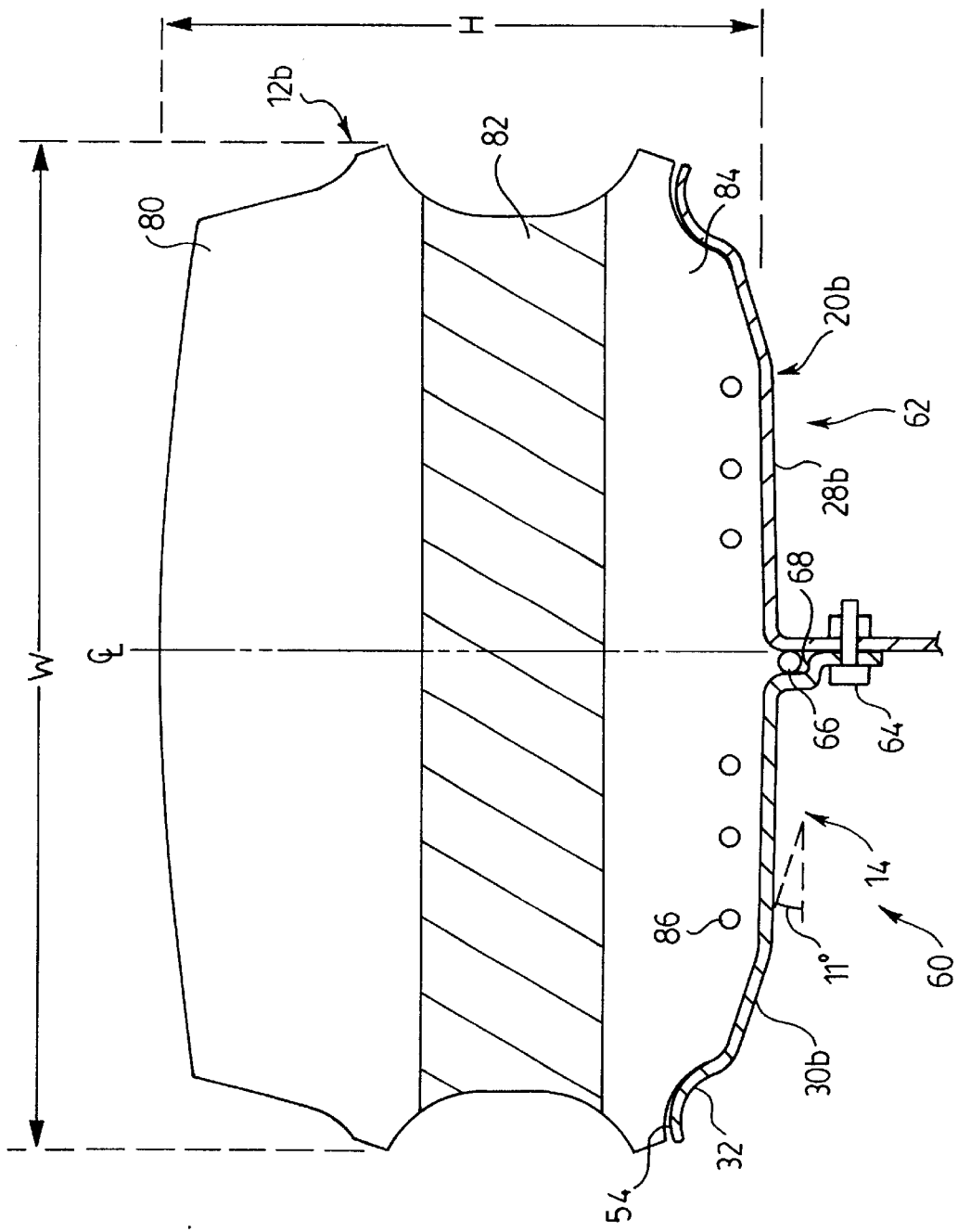
FIG. 3 is a section, similar to FIG. 2 of a solid tire configuration.

The utilization of a split rim 20a also facilitates the use of the preferred bead seat angles with solid tire configurations as shown in FIG. 3 in which like components will be denoted by like reference numerals with a suffix b added for clarity. In the embodiment of FIG. 3, the pneumatic tire 12 is replaced with a solid tire 12b having an outer cap 80, central resilient band 82 and a mounting band 84. Steel reinforcing rings 86 are incorporated into the mounting band 84, which is profiled to be complimentary to the inclined bead seat 30b. The bead seats 30b are inclined at between 10° and 12° as in previous embodiments to retain the enhanced torque transfer characteristics. The solid tire 12b retains the aspect ratio of the pneumatic tire 12 to provide a lower rolling resistance and less rubber compound in the body of the tire.

Again the provision of the 10° to 12° bead seat angle facilitates assembly of the solid tire 12b on the two halves 60,62 of the split rim 20b whilst retaining the enhanced torque transfer characteristics.

Although the invention has been described with reference to certain specific embodiments, various modifications thereof will be apparent to those skilled in the art without departing from the spirit and scope of the Invention as outlined in the claims appended hereto.

What is claimed is:

1. A vehicle wheel assembly wherein having a rim and a tire mounted on said rim, said rim having a centrally disposed well and a frustoconical bead support surface to either side thereof, said bead support surfaces having an angle of 11° with respect to the axis of rotation, said bead support surface each terminating in an upstanding flange overlapping a radially inner portion of said tire, said tire including a pair of annular beads, each associated with a respective one of said bead support surfaces, a plurality of plies extending between said beads to define a carcass having a pair of radially extending sidewalls and a tread portion, an elastomeric cap covering said carcass and extending across each of said sidewalls and said tread portion, said plies extending about said bed to provide a pair of inwardly directed bead seats for engagement with said bead support surfaces, said bead seats having a substantially frustoconical inwardly directed sealing surface complementary to said bead support surfaces, said tire having a radial spacing between said seating surface and a radially outer surface of said cap that is less than or equal to 60% of a maximum width of said tire in a free body state.

2. A vehicle wheel assembly wherein having a rim and a tire mounted on said rim, said rim having a centrally disposed well and a frustoconical bead support surface to either side thereof having an angle with respect to the axis of rotation in the range of 10° to 12°, said bead support surfaces each terminating in an upstanding flange overlapping a radially inner portion of said tire, said flanges being part circular in cross section and extending radially from said support surfaces and have a radius of curvature greater than 0.5" said tire including a pair of annular beads, each associated with a respective one of said bead support surfaces, a plurality of plies extending between said beads to define a carcass having a pair of radially extending sidewalls and a tread portion, an elastomeric cap covering said carcass and extending across each of said sidewalls and said tread portion, said plies extending about said beads to provide a pair of inwardly directed bead seats for engagement with said bead support surfaces, said bead seats having a substantially frustoconical inwardly directed sealing surface complementary to said bead support surfaces, said tire having a radial spacing between said sealing surface and a radially outer surface of said cap that is less than or equal to 60% of a maximum width of said tire in a free body state.

* * * * *